No. 855,597. PATENTED JUNE 4, 1907.
T. J. THORP.
MOTOR VEHICLE.
APPLICATION FILED MAY 11, 1906.

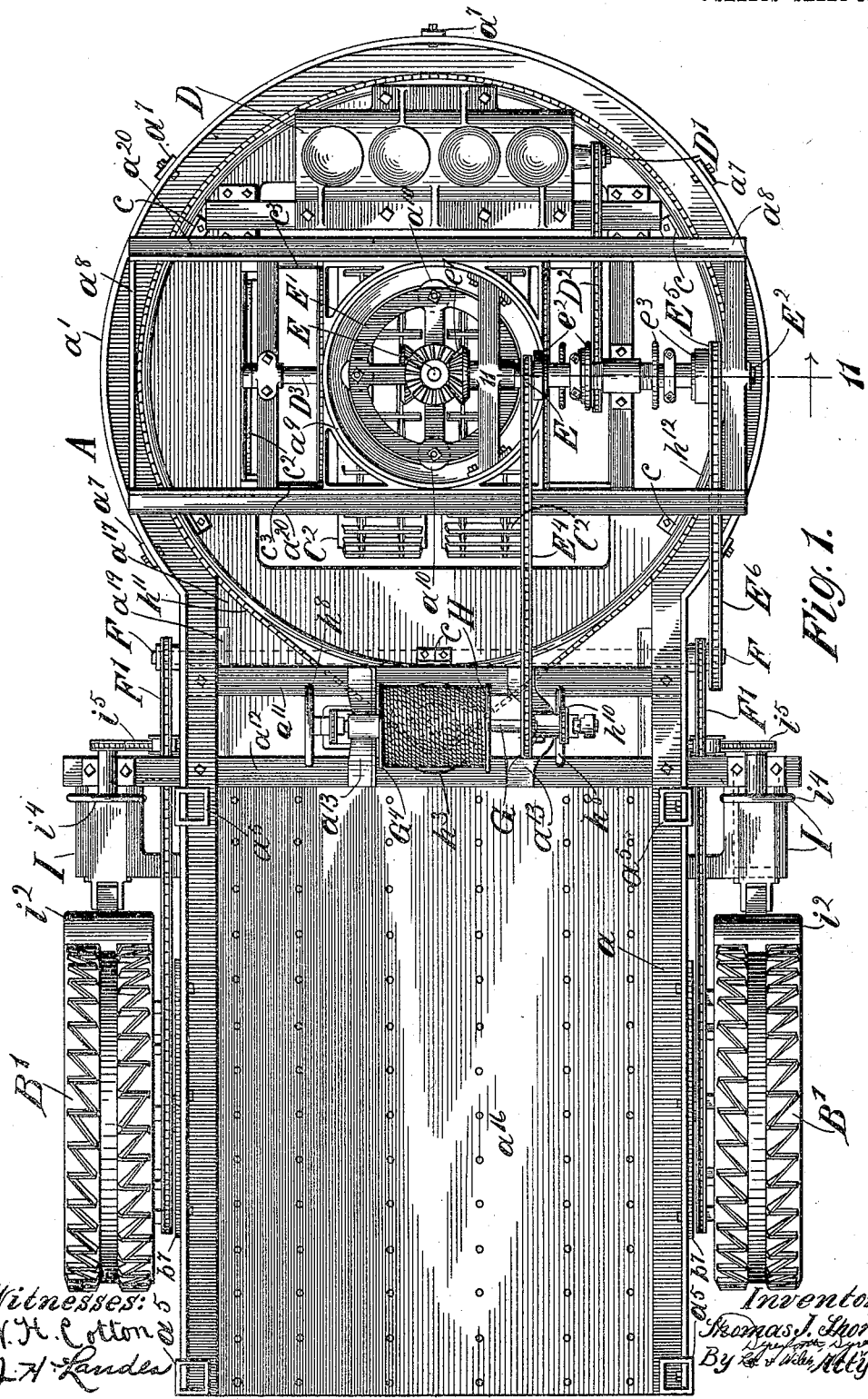

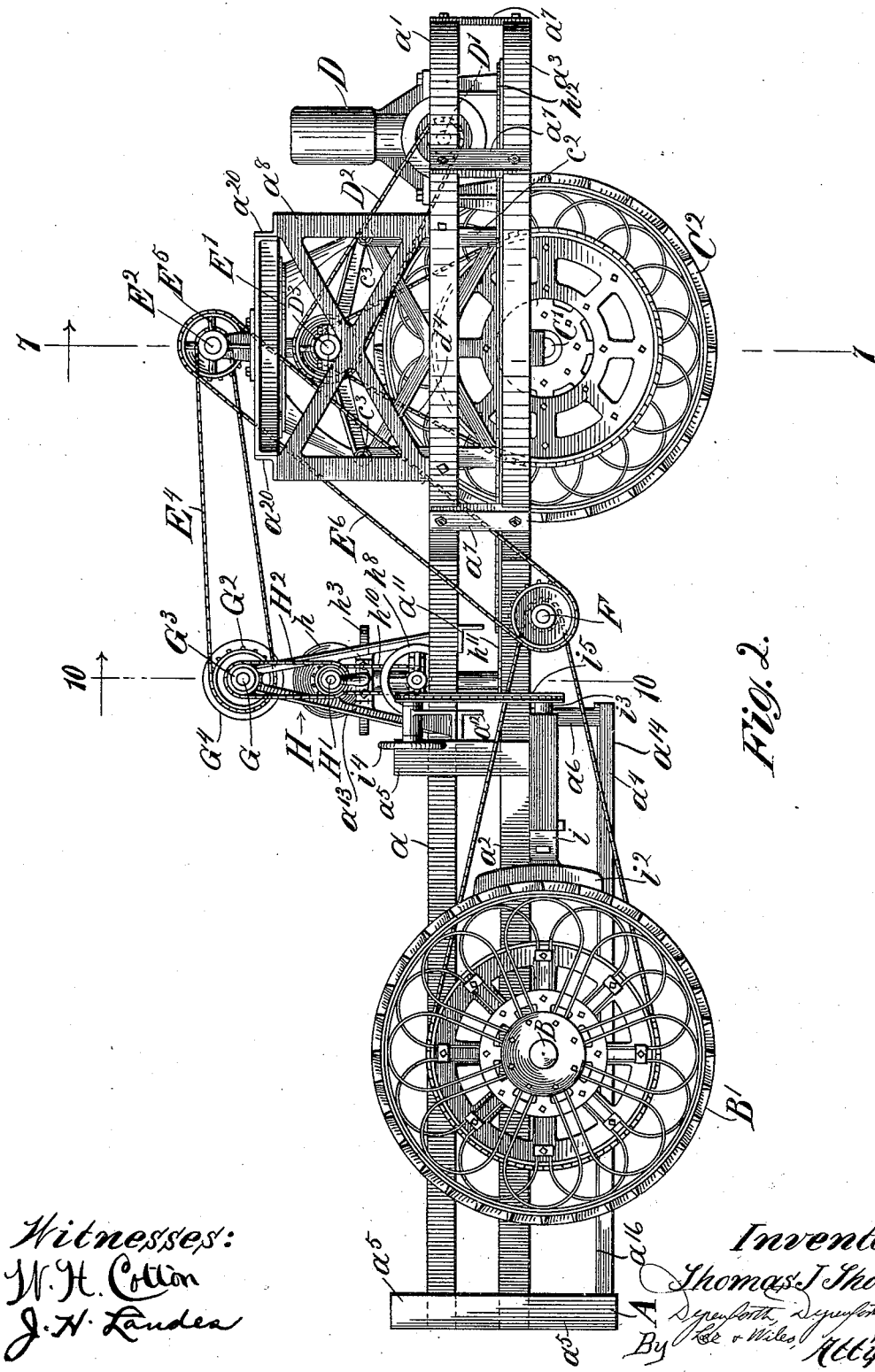

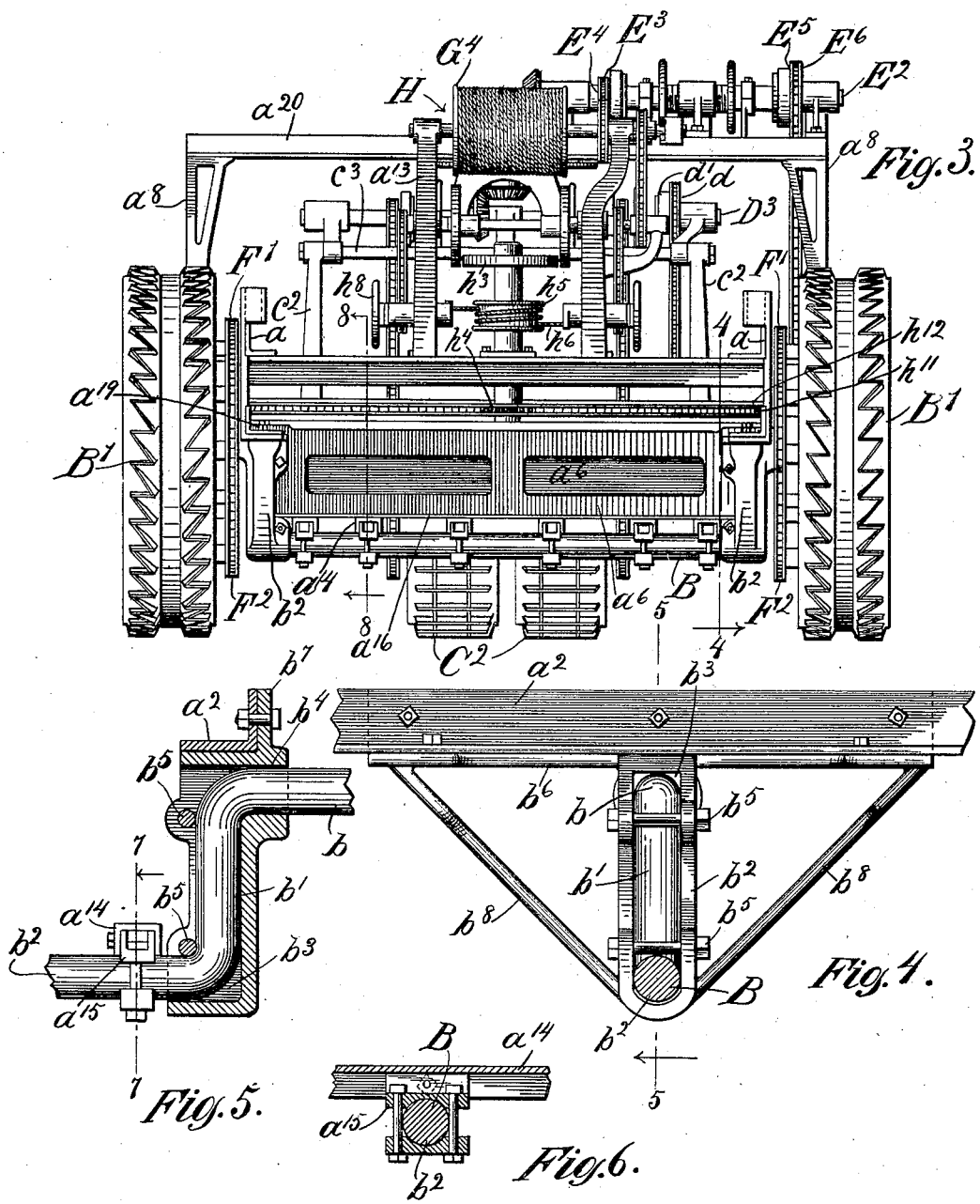

6 SHEETS—SHEET 5.

Witnesses:
W. H. Cotton
J. H. Landes

Inventor:
Thomas J. Thorp.
By Dynforth, Dynforth, Lee & Wiles,
Attys.

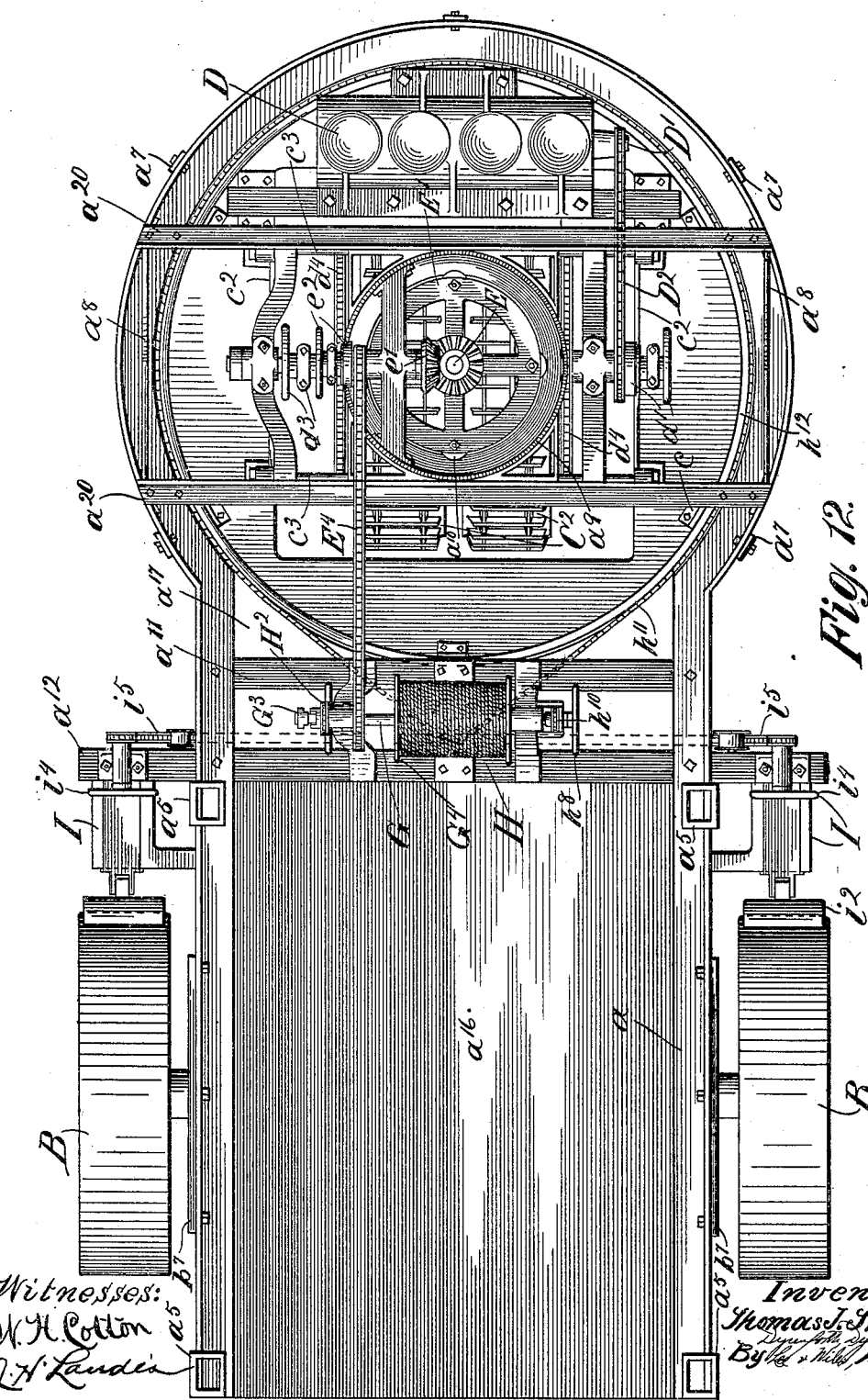

UNITED STATES PATENT OFFICE.

THOMAS J. THORP, OF CORVALLIS, OREGON, ASSIGNOR TO T. J. THORP MFG COMPANY, OF CORVALLIS, OREGON, A CORPORATION OF OREGON.

MOTOR-VEHICLE.

No. 855,597. Specification of Letters Patent. Patented June 4, 1907.

Application filed May 11, 1906. Serial No. 316,311.

*To all whom it may concern:*

Be it known that I, THOMAS J. THORP, a citizen of the United States, residing at Corvallis, in the county of Benton and State of Oregon, have invented a new and useful Improvement in Motor-Vehicles, of which the following is a specification.

My invention relates particularly to self-propelled vehicles for truck purposes; and my primary object is to provide a strong and thoroughly reliable construction for this class or vehicles.

The invention is illustrated in its preferred embodiment in the accompanying drawings, in which—

Figure 7:
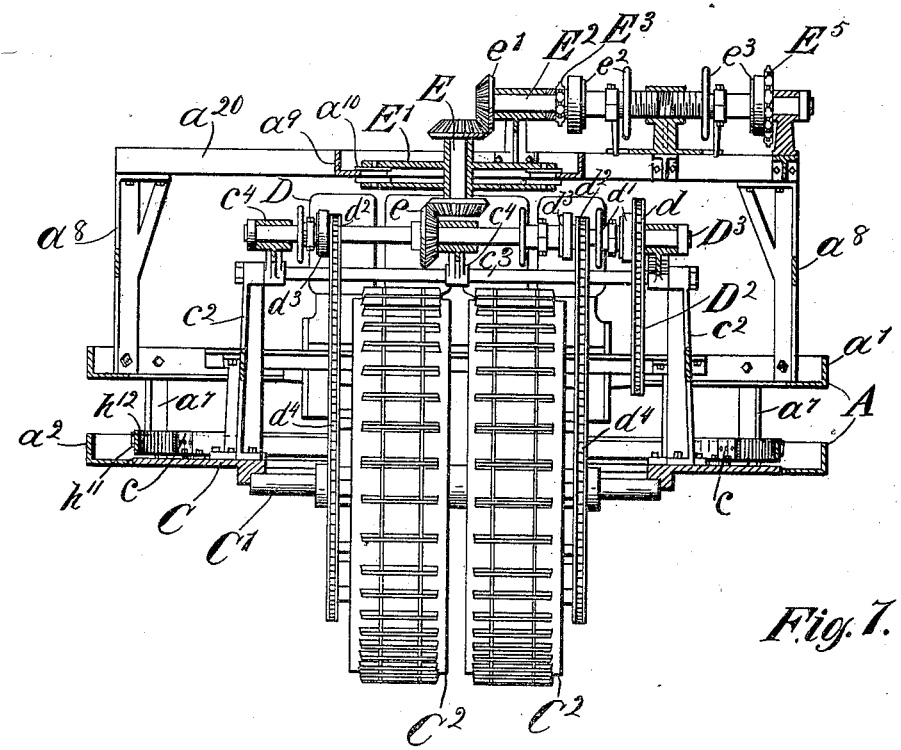
Figure 8:
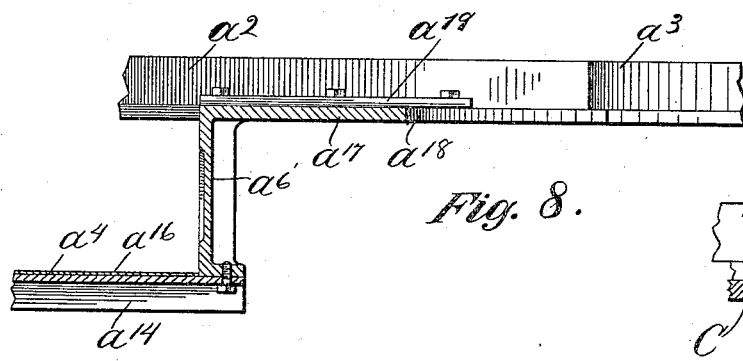
Figure 9:
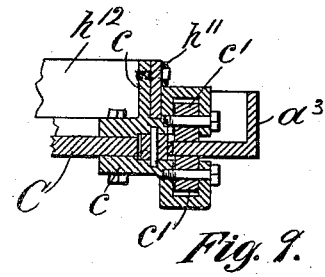
Figure 10:
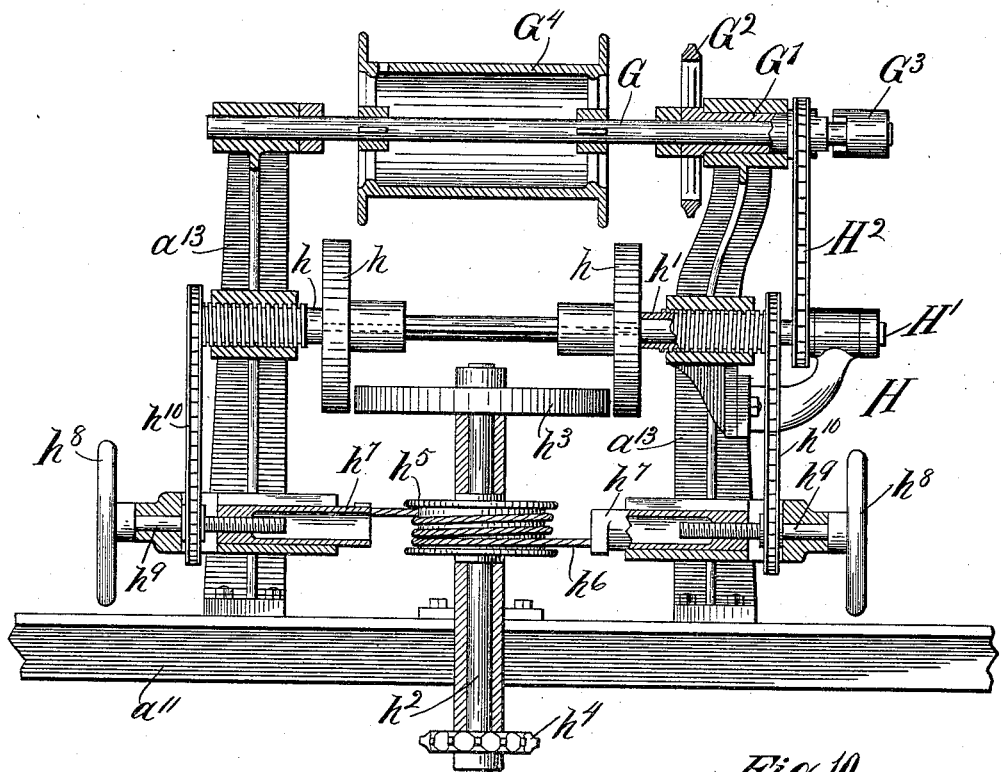
Figure 11:
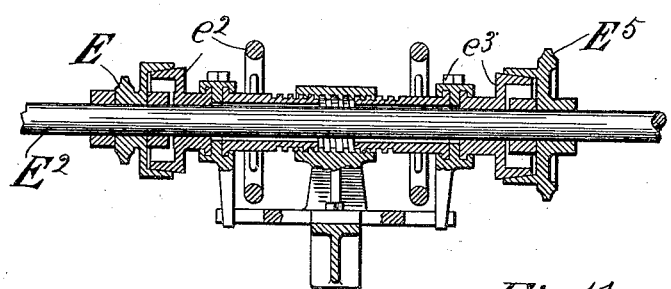

Figure 1 represents a plan view of my improved self-propelled truck; Fig. 2, a side elevational view of the same; Fig. 3, a rear elevational view of the same; Fig. 4, a broken section taken as indicated at line 4 of Fig. 3, and showing a detail of an axle-bracket employed; Fig. 5, a section taken as indicated at line 5 of Fig. 4; Fig. 6, a section taken as indicated at line 6 of Fig. 5; Fig. 7, a section taken as indicated at line 7 of Fig. 2; Fig. 8, a section taken as indicated at line 8 of Fig. 3, and showing a detail of the connections between the bottom of the truck-body and the circle of the main frame which is supported on the turn-table carried by the front wheels; Fig. 9, a detailed sectional view showing the connection between the front portion of the main frame and the wheel-frame, or turn-table, mounted on the front wheels of the machine; Fig. 10, a sectional view taken as indicated at line 10 of Fig. 2, and showing details of the steering mechanism and of a hoisting drum; Fig. 11, a section taken as indicated at line 11 of Fig. 1; and Fig. 12, a plan view showing a slight modification of the machine.

Referring to Figs. 1 to 11 inclusive, A represents the main frame of the machine; B, the rear axle supported on wheels $B^1$; C, a turn-table, or front wheel frame, supported on an axle $C^1$ upon which are journaled front wheels $C^2$; D, an engine mounted on the wheel-frame C and having a shaft $D^1$ connected by a sprocket-chain $D^2$ to a transverse shaft $D^3$ supported on the wheel-frame C; E, a vertical shaft journaled in a head $E^1$ and connected by bevel gears with the shaft $D^3$, said shaft E being in alinement with the vertical axis of the wheel-frame C; $E^2$, a transverse shaft geared to the shaft E and journaled on a standard carried by the front end of the main-frame; $E^3$, a sprocket-wheel mounted on the shaft $E^2$ and serving to actuate a sprocket-chain $E^4$; $E^5$, a sprocket-wheel mounted on the shaft $E^2$ and serving to actuate a sprocket-chain $E^6$; F, a transverse shaft supported by suitable hangers beneath the main frame and actuated by the sprocket-chain $E^6$; $F^1$, sprocket-chains actuated by the shaft F and geared to sprocket wheels $F^2$ connected with the rear wheels $B^1$ of the machine; G, a transverse shaft mounted in suitable standards on the main frame and equipped with a sleeve $G^1$ having connected therewith a sprocket-wheel $G^2$ actuated by the chain $E^4$; $G^3$, a clutch serving to connect the sleeve $G^1$ with the shaft G; $G^4$, a hoisting drum secured on the shaft G; H, steering mechanism having as a part thereof a shaft $H^1$ connected by a sprocket-chain $H^2$ with the sleeve $G^1$; and I, brake-mechanism connected with the main frame and serving to act upon the rear wheels.

The frame A comprises an upper member $a$ formed with a partly circular portion $a^1$ at its front end; an intermediate frame-member $a^2$ formed with a partly circular portion $a^3$ at its front end; a bottom $a^4$ whose rear end is connected by members $a^5$ with the rear ends of the members $a$, $a^2$, and whose front end is connected by a member $a^6$ with the member $a^2$; members $a^7$ connecting the members $a$, $a^2$ at their front portions; a standard $a^8$ supported on the circle $a^1$ of the member $a$, as shown in Figs. 1 and 7, said standard serving to support the shaft $E^2$; a circular member, or bracket, $a^9$ supported on the standard $a^8$, within which member the member $E^1$ is mounted to turn, the member $E^1$ being equipped with rollers $a^{10}$ engaging the bracket $a^9$; a pair of transverse frame members $a^{11}$, $a^{12}$ connecting the members of the frame part $a$, as shown in Figs. 1 and 2; and standards $a^{13}$ supported on the members $a^{11}$, $a^{12}$ and serving to support the shaft G and steering mechanism H, as shown in Fig. 10. The frame-member $a$ comprises an angle-bar bent intermediately to form the circle $a^1$ and having its ends extending rearwardly to form side members. The member $a^2$ comprises an angle-bar similarly bent to form the circle $a^3$ and rearwardly extending side members. The bottom $a^4$ comprises channel-bars $a^{14}$ passing over the depressed intermediate portion of the rear axle and secured thereto by clips $a^{15}$, as shown in detail in Figs. 5 and 6; and a sheet-metal bottom plate $a^{16}$ resting upon and riveted to the channel-bars, as shown in Figs. 1 and 8. The front ends of the channel-bars $a^{14}$ are secured to the member $a^6$, as shown in Fig. 8. The member $a^6$ constitutes the front end of the body of the machine, and said member is formed with a forwardly projecting flange $a^{17}$ at its upper portion, which is made concave at its front edge, as indicated at $a^{18}$ in Fig. 8, to complete the circle $a^3$. The lateral edges of the flange $a^{17}$ are joined by bars $a^{19}$ to the inturned flanges of the side members of the frame part $a^2$. The standard $a^8$ has its ends firmly bolted to the circle $a^1$ of the upper frame member $a^2$ and is provided with transverse members $a^{20}$ between which the circle $a^9$ is firmly secured.

The rear axle B is formed with spindles $b$, vertical portions $b^1$, and an intermediate portion $b^2$ connecting the lower ends of the vertical portions $b^1$. Thus, the intermediate portion of the axle is depressed below the plane of the spindles. The axle is connected with the frame $a^2$ by axle-brackets $b^2$, each of which has a vertical channel $b^3$ receiving the vertical portion $b^1$ of the axle and a perforation $b^4$ through which the spindle projects. The vertical portion of the axle is secured within said channel by bolts $b^5$. The axle-bracket has a horizontal upper portion $b^6$ affording a bearing for the corresponding part of the frame member $a^2$, said horizontal part having a vertical flange $b^7$ which is bolted to the vertical flange of the member $a^2$. This will be clearly understood by reference to Figs. 4 and 5. Brace-members $b^8$ connect the ends of the horizontal portion $b^6$ with the lower end of the bracket proper.

The wheel-frame C is equipped, as shown in detail in Fig. 9, with brackets $c$ equipped with rollers $c^1$ which bear upon the horizontal flange of the circular portion $a^3$ of the frame-member $a^2$. The wheels $C^2$ are journaled to rotate independently of each other upon the axle $C^1$. Upon the wheel-frame C are mounted standards $c^2$ which support cross-rods $c^3$ connected by brackets $c^4$ in which the shaft $D^3$ is journaled. The head $E^1$ is firmly supported on the standard $c^2$ through the medium of the cross-rods, or shafts, $c^3$.

The motor D may be of any approved construction. The sprocket-chain $D^2$ connects with a sprocket-wheel $d$ loosely mounted on the shaft $D^3$ and controlled by a clutch $d^1$. The shaft $d^3$ is also equipped with loosely mounted sprocket-wheels $d^2$ controlled by clutches $d^3$ and connected by sprocket-chains $d^4$ with the front wheels $C^2$ of the machine. The details of the clutches $d^3$ are unimportant, but it may be mentioned that they are similar to the clutches shown in Fig. 11.

The vertical shaft E is connected with the horizontal shaft $D^3$ by bevel gears $e$, and with the horizontal shaft $E^2$ by bevel gears $e^1$. The sprocket-wheels $E^3$, $E^5$ are controlled by clutches $e^2$, $e^3$, as shown in detail in Fig. 11. The details of the clutches will be understood without further description. It will be understood that the rotation of the shaft F, and through the medium thereof the driving of the rear wheels of the machine, is controlled by the clutch $e^3$. The actuation of the sleeve $G^1$ through the medium of the sprocket-chain $E^4$ is controlled by the clutch $e^2$. The clutch $G^3$ on the shaft G is an ordinary jaw-clutch, and may be actuated by any suitable means (not shown), when it is desired to employ the drum $G^4$.

The steering mechanism H comprises the shaft $H^1$ which is continuously operated through the medium of the sprocket-chain $H^2$; a pair of shiftable friction disks $h$ connected with sleeves $h^1$ mounted on the shaft $H^1$, said sleeves having screw connection with the standard $a^{13}$, as shown in Fig. 10; a vertical steering shaft $h^2$ equipped at its upper end with a friction disk $h^3$ located within the disks $h$, and equipped at its lower end with a sprocket-wheel $h^4$; a sheave $h^5$ fixed on the shaft $h^2$ and connected by a cable $h^6$ with a pair of slides $h^7$; a pair of hand-wheels $h^8$ having stems $h^9$ having threaded connection with the slides $h^7$; a pair of sprocket-chains $h^{10}$ connecting the stems $h^9$ with the sleeves $h^1$ of the friction disks $h$; and a sprocket-chain $h^{11}$ connecting the sprocket-wheel $h^4$ with a large sprocket-wheel $h^{12}$ which is firmly connected with the front wheel-frame C through the medium of the brackets $c$, as shown in Fig. 9.

The construction of the brake mechanism I is not claimed in the present application. It is sufficient to say that it comprises a pair of slides $i$ carrying the brake-shoes $i^2$; threaded stems $i^3$ serving to actuate the slides $i$; a pair of hand-wheels $i^4$; and a sprocket-chain $i^5$ connecting the hand-wheels with the screws $i^3$ which serve to actuate the slides carrying the brake-shoes. The construction provides for the simultaneous actuation of the brake-shoes from either side of the machine.

The operation of the machine will be readily understood. Power is communicated from the engine through the medium of the sprocket-chain $D^2$ to the sprocket-wheel $d$ on the shaft $D^3$, and through the medium of the clutch $d^1$ the shaft $D^3$ may be actuated at will. Through the medium of the clutches $d^3$, either or both of the front wheels of the machine may be actuated at will. Power is transmitted from the horizontal shaft D³ through the vertical shaft E to the horizontal shaft E². By means of the clutches e², e³ power may be transmitted at will through the chain E⁴ to the sleeve G¹ and through the chain E⁶ to the rear wheels of the machine. From the sleeve G¹ the shaft H¹ of the steering mechanism is continuously actuated, and, at will, either of the slides h⁷ may be actuated through the medium of a hand-wheel h⁸ to release the steering shaft h² and cause said shaft to be rotated through the medium of one of the friction disks h, according to the direction in which it is desired to steer the machine. When the slides h⁷ are in the position shown in Fig. 10, both friction disks h are out of engagement with the disk h³, and the steering shaft h² is firmly gripped by the cable h⁵. In such condition, the machine will follow a straight course. The front wheels of the machine may be thrown into gear through the medium of the clutches e²; or, in emergency, only one of the front wheels may be thrown into gear to aid the machine in turning sharply about.

The modified construction shown in Fig. 12 is similar to the construction already described, except that the shaft F and the attendant means for connecting the rear wheels of the machine with the shaft E² are omitted, the front wheels of the machine being wholly depended upon for traction purposes. Such a construction is suitable for the lighter class of work. Inasmuch as the construction does not differ from the construction above described, the principal parts shown in Fig. 12 are lettered to correspond with the same parts shown in the other figures.

The construction has been described in detail for clearness of understanding, and no undue limitation should be understood therefrom.

What I regard as new, and desire to secure by Letters Patent, is—

1. The combination of a front wheel, a front wheel-frame supported thereon, a main frame having its front end swiveled on said wheel-frame, wheels supporting the rear end of the main frame, a motor mounted on said wheel-frame, a vertical shaft co-axial with the axis of said wheel-frame and geared to said motor, and steering mechanism mounted on the main frame and geared to said vertical shaft.

2. The combination of a front wheel, a front wheel-frame supported thereon, a main frame having its front end swiveled on said wheel-frame, wheels supporting the rear end of the main frame, a motor mounted on said wheel-frame, a vertical shaft co-axial with the axis of said wheel-frame and geared to said motor, and means connecting said vertical shaft with one of said last-named wheels.

3. The combination of a front wheel, a front wheel-frame supported thereon, a main frame having its front end swiveled on said wheel-frame, wheels supporting the rear end of the main frame, a motor mounted on said wheel-frame, a vertical shaft co-axial with the axis of said wheel-frame and geared to said motor, steering mechanism mounted on the main frame, and means gearing said vertical shaft to said steering mechanism and to one of said last-named wheels.

4. The combination of a front wheel, a front wheel-frame, a main frame having its front end swiveled on said wheel-frame, wheels supporting the rear end of the main frame, a motor mounted on said wheel-frame, a horizontal shaft supported on the wheel-frame and geared to said motor, a vertical shaft co-axial with the axis of said wheel-frame and geared to said horizontal shaft, a shaft journaled on the front end of the main frame and geared to said vertical shaft, and means for transmitting power from said last-named shaft to mechanism on the main frame of the machine.

5. The combination of a front wheel, a front wheel-frame, a main frame having its front end swiveled on said wheel-frame, wheels supporting the rear end of the main frame, a vertical shaft co-axial with the axis of said wheel-frame, a motor mounted on said wheel-frame and geared to said vertical shaft, a horizontal shaft mounted on the front end of the main frame and geared to said vertical shaft, and means for transmitting motion from said horizontal shaft to the rear wheels of the machine.

6. The combination of a front wheel, a front wheel-frame, a main frame having its front end swiveled on said wheel frame, a motor mounted on said wheel-frame, a vertical shaft co-axial with the axis of said wheel-frame and geared to said motor, a steering shaft mounted on the main frame and geared to said vertical shaft, and connecting means between said steering shaft and said wheel-frame, for the purpose set forth.

7. The combination of a front wheel, a front wheel-frame, a main frame having its front end swiveled on said wheel-frame, a motor mounted on said wheel-frame, a vertical shaft co-axial with the axis of said wheel-frame and geared to said motor, means for transmitting motion from the motor to said front wheel, a steering shaft mounted on the main frame in the rear of said wheel frame and geared to said vertical shaft, and means connecting said steering shaft with said wheel-frame.

8. The combination of a pair of front wheels, a front wheel-frame, a main frame having its front end swiveled on said wheel-frame, a motor mounted on said wheel-frame, a vertical shaft in alinement with the axis of said wheel-frame and geared to said motor, means for transmitting motion at will from said motor to said front wheels, a steering shaft mounted on the main frame and connected with said wheel-frame, and means for communicating motion in either direction from said vertical shaft to said steering shaft, for the purpose set forth.

9. The combination of a front wheel, a wheel-frame, a main frame having its front end swiveled on said wheel-frame, a motor mounted on the wheel-frame, a vertical shaft in alinement with the axis of said wheel-frame and geared to said motor, steering mechanism mounted on the main-frame and geared to said wheel-frame, means for communicating motion from said vertical shaft to said steering mechanism, and a hoisting drum actuated from said vertical shaft.

10. The combination of a front wheel, a wheel-frame, a main frame having its front end swiveled on said wheel-frame, a motor mounted on said wheel-frame, a vertical shaft in alinement with the axis of said wheel-frame and geared to said motor, a drum mounted on the main frame, and means for transmitting motion at will from said vertical shaft to said drum.

11. The combination of a front wheel, a wheel-frame, a motor mounted on said wheel-frame, a main frame having its front end swiveled on said wheel-frame, a shaft in vertical alinement with the axis of said wheel-frame and geared to said motor, a shaft supported on the main frame and equipped with a drum, a sleeve journaled on said shaft and geared to said vertical shaft, steering mechanism connected with said wheel-frame, and means for communicating motion from said sleeve to said steering mechanism.

12. The combination of a pair of front wheels, a wheel-frame mounted thereon, a main frame having its front end swiveled on said wheel-frame, rear wheels for the main frame, a motor mounted on the wheel-frame, a vertical shaft co-axial with the axis of said wheel-frame and geared to said motor, a transverse shaft mounted on the front end of the main frame and geared to said vertical shaft, a pair of sprocket-chains actuated by said transverse shaft, steering mechanism mounted on the main frame and actuated by one of said sprocket-chains and connected with said wheel-frame, and means for transmitting motion from the other of said sprocket-chains to the rear wheels of the machine.

13. The combination of a front wheel, a wheel-frame supported thereon, a main frame having its front end swiveled on said wheel-frame, a motor mounted on said wheel-frame, a vertical shaft geared to said motor, and steering mechanism comprising a horizontal shaft actuated from said vertical shaft and equipped with a pair of friction disks, a vertical shaft geared to said wheel-frame and equipped with a friction disk, and means for shifting said first-named disks.

14. The combination of a front wheel, a wheel-frame supported thereon, a main frame having its front end swiveled on said wheel-frame, a motor mounted on said wheel-frame, a vertical shaft geared to said motor, and steering mechanism comprising a horizontal shaft geared to said vertical shaft and equipped with a pair of shiftable friction disks, a steering shaft geared to said wheel-frame and equipped with a friction disk located between said first-named disks, a pair of slides, a gripping cable for said steering shaft connected with said slides, and means for actuating said slides and shifting said first-named friction disks.

15. The combination of a front wheel, a front wheel-frame, a main frame having its front end swiveled on said wheel-frame, a pair of rear wheels, a standard supported on the wheel-frame, a standard supported on the front end of the main frame, anti-friction bearings between said standards, a motor mounted on the wheel-frame, a vertical shaft journaled in the standard carried by the wheel-frame and geared to the motor, a transverse shaft journaled in the standard carried by the front end of the main frame and geared to said vertical shaft, and means for transmitting motion from said last-named shaft.

16. The combination of a front wheel, a wheel-frame, a rear axle having its body-portion depressed beneath the plane of its spindles, and a main frame comprising a pair of members having partly circular front-portions, the lower one of said members being swiveled on said wheel-frame, and a bottom comprising bars supported on said axle, and a connecting member joining the front ends of said bars to the lower one of said first-named members, said connecting member serving to complete the circle of the member with which it connects.

17. A frame for the purpose set forth, comprising an upper member curved intermediately to form a partial circle and having rearwardly extending side members, a lower member curved intermediately to form a partial circle and having rearwardly extending side members, a bottom comprising bars and a plate supported on said bars, and a member connecting the front ends of said bars with the lower one of said first-named members, said connecting member serving to complete the circle of the second-named member.

18. A frame for the purpose set forth, comprising an upper member curved intermediately to form a partial circle and having rearwardly extending side members, a lower member curved intermediately to form a partial circle and having rearwardly extending side members, axle-brackets connected with said second-named member and having vertical channels, an axle having its body-portion depressed beneath the plane of its spindles and vertical portions received by the channels of said brackets, and a bottom comprising bars supported on said axle and having their front ends connected with said second-named member.

THOMAS J. THORP.

In presence of—
A. U. THORIEN,
J. H. LANDES.